(12) United States Patent
Pruden et al.

(10) Patent No.: US 10,419,815 B2
(45) Date of Patent: Sep. 17, 2019

(54) BANDWIDTH LIMITED DYNAMIC FRAME RATE VIDEO TRICK PLAY

(71) Applicant: Comcast Cable Communications, LLC, Philadelphia, PA (US)

(72) Inventors: Benny J. Pruden, Brownstown, PA (US); Stephen Allinson, Fairless Hills, PA (US)

(73) Assignee: Comcast Cable Communications, LLC, Philadelphia, PA (US)

(*) Notice: Subject to any disclaimer, the term of this patent is extended or adjusted under 35 U.S.C. 154(b) by 0 days.

(21) Appl. No.: 14/862,739

(22) Filed: Sep. 23, 2015

(65) Prior Publication Data

US 2017/0085953 A1   Mar. 23, 2017

(51) Int. Cl.
| | | |
|---|---|---|
| H04N 21/4402 | (2011.01) | |
| H04N 21/433 | (2011.01) | |
| H04N 21/472 | (2011.01) | |
| G11B 27/00 | (2006.01) | |
| H04N 21/2343 | (2011.01) | |
| H04N 21/2387 | (2011.01) | |

(52) U.S. Cl.
CPC ... *H04N 21/440281* (2013.01); *G11B 27/005* (2013.01); *H04N 21/2387* (2013.01); *H04N 21/234381* (2013.01); *H04N 21/4333* (2013.01); *H04N 21/47217* (2013.01)

(58) Field of Classification Search
CPC ....... H04N 21/440281; H04N 21/2387; H04N 21/4333; H04N 21/47217; G11B 27/005
See application file for complete search history.

(56) References Cited

U.S. PATENT DOCUMENTS

| | | | | |
|---|---|---|---|---|
| 7,593,326 | B2 * | 9/2009 | Collet | H04L 29/06027 370/229 |
| 8,079,053 | B2 * | 12/2011 | Yampanis | H04N 7/17327 725/100 |
| 8,407,747 | B1 * | 3/2013 | Inskip | H04N 21/23438 386/343 |
| 8,804,508 | B1 * | 8/2014 | Hobbs | H04N 21/2402 370/230 |
| 9,049,271 | B1 * | 6/2015 | Hobbs | H04L 47/25 |
| 9,203,722 | B2 * | 12/2015 | Parker | H04L 43/0882 |
| 9,830,566 | B1 * | 11/2017 | Dailianas | G06Q 10/0631 |
| 2004/0156624 | A1 * | 8/2004 | Kent, Jr. | H04N 5/775 386/263 |

(Continued)

FOREIGN PATENT DOCUMENTS

WO    WO 2011/100727    8/2011

OTHER PUBLICATIONS

European Search Report dated Feb. 14, 2017, issued in European Patent Application 16190353, 8 pgs.

*Primary Examiner* — Chenea Davis
(74) *Attorney, Agent, or Firm* — BakerHostetler

(57) ABSTRACT

Methods and systems for managing data and/or operations on data such as content are disclosed. A method can comprise transmitting content to facilitate playback of the content. A trick play operation relating to the transmitted content can be detected. A threshold bandwidth can be determined based on normal playback of the content. A frame rate of the transmitted content can be adjusted during the trick play operation such that a bandwidth of the trick play operation is less than or equal to the determined threshold bandwidth.

20 Claims, 7 Drawing Sheets

(56) References Cited

U.S. PATENT DOCUMENTS

| | | | | |
|---|---|---|---|---|
| 2004/0257994 | A1* | 12/2004 | Paskett | H04L 47/10 370/230 |
| 2004/0268397 | A1* | 12/2004 | Dunbar | H04N 5/783 725/88 |
| 2005/0099869 | A1* | 5/2005 | Crinon | H04N 19/44 365/222 |
| 2007/0005792 | A1* | 1/2007 | Collet | H04L 29/06027 709/231 |
| 2007/0169161 | A1 | 7/2007 | Kienzle et al. | |
| 2009/0135839 | A1* | 5/2009 | Khasnabish | H04L 63/164 370/401 |
| 2010/0135636 | A1* | 6/2010 | Zhang | H04N 5/783 386/343 |
| 2011/0116772 | A1* | 5/2011 | Kwon | H04N 21/23439 386/343 |
| 2012/0251086 | A1* | 10/2012 | Cook | H04N 5/783 386/343 |
| 2013/0132462 | A1 | 5/2013 | Moorer | |
| 2013/0265385 | A1* | 10/2013 | Wang | H04N 7/152 348/14.09 |
| 2013/0297819 | A1* | 11/2013 | Mittal | H04L 43/0876 709/232 |
| 2014/0003450 | A1* | 1/2014 | Bentley | H04N 7/15 370/468 |
| 2015/0363220 | A1* | 12/2015 | Yamada | G06F 9/50 711/114 |
| 2016/0094475 | A1* | 3/2016 | Lynch | H04L 47/19 348/14.12 |
| 2016/0316174 | A1* | 10/2016 | Whynot | H04L 49/35 |

* cited by examiner

BANDWIDTH LIMITED DYNAMIC FRAME RATE VIDEO TRICK PLAY

BACKGROUND

Data such as content can be provided by multiple sources. Recipients of data may be able to control the playback of certain content using time shifting (e.g., trick play) features such as pause, rewind, and fast-forward, for example. For example, digital video recorder (DVR) devices can be configured to receive and store data such as content and to control the playback of the stored content using time shifting features.

SUMMARY

When storing and retrieving content to/from storage devices such as a hard disk, flash memory, and/or network based storage to implement playback (e.g., DVR playback or time shift buffer), there can be limited input/output (I/O) and/or network bandwidth. This problem is exacerbated during trick play such as fast-forward or rewind, especially when supporting multiple audio/video streams and clients on a single storage device. Due to the I/O bandwidth to/from storage devices and/or network bandwidth limitations, the number of simultaneous audio/video DVR or time shift buffer sessions/clients that can be supported is limited. Traditionally the maximum number of audio/video sessions/clients is based on the maximum bandwidth required for the worst case of the maximum audio/video stream bitrate and all sessions/clients simultaneously using the highest speed fast forward/rewind trick play. The present disclosure addresses these and other shortcomings of the prior art.

In an aspect, a method can comprise transmitting content to facilitate playback of the content. A trick play operation relating to the transmitted content can be detected. A threshold bandwidth can be determined based on normal playback of the content. A frame rate of the transmitted content can be adjusted during the trick play operation such that a bandwidth of the trick play operation is less than or equal to the determined threshold bandwidth.

In another aspect, a method can comprise detecting one or more active communication sessions. A trick play operation relating to at least one communication session of the one or more communication sessions can be detected. A threshold bandwidth can be determined based on a normal playback associated with the at least one communication session. A frame rate of the at least one communication session can be adjusted such that a bandwidth of the at least one communication session is less than or equal to the determined threshold bandwidth.

In another aspect, a method can comprise receiving first content by a playback device, wherein the first content is received at a first frame rate. A trick play operation can be caused to execute. The trick play operation can relate to the received first content. Second content can be received by the playback device during the trick play operation. The second content can be received at a second frame rate. The second frame rate can maintain a bandwidth during the trick play operation that is less than or equal to a threshold bandwidth associated with a normal playback of the first content.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate aspects and together with the description, serve to explain the principles of the methods and systems.

DETAILED DESCRIPTION

In an aspect, a number of sessions/devices can be supported on a gateway device by using a dynamic frame rate. As an example, the dynamic frame rate can be implemented during execution of a trick play feature during playback of content. As a further example, the number of supported sessions/devices can be based on a maximum bandwidth required for a maximum bitrate record and reads for normal speed playback (e.g., a sum of the record and playback bitrates for all concurrent streams). In the case that this maximum number of sessions/clients is simultaneously active, and all sessions/clients are using the maximum bitrate stream, then the maximum input/output (I/O) bandwidth to storage or network bandwidth for each session/client can be limited to the I/O or network bandwidth for normal speed playback. The limitation can be achieved, for example, by reducing the frame rate for trick play such that the bandwidth load is less than or equal to the nominal bandwidth used at normal playback speed.

Figure 1:
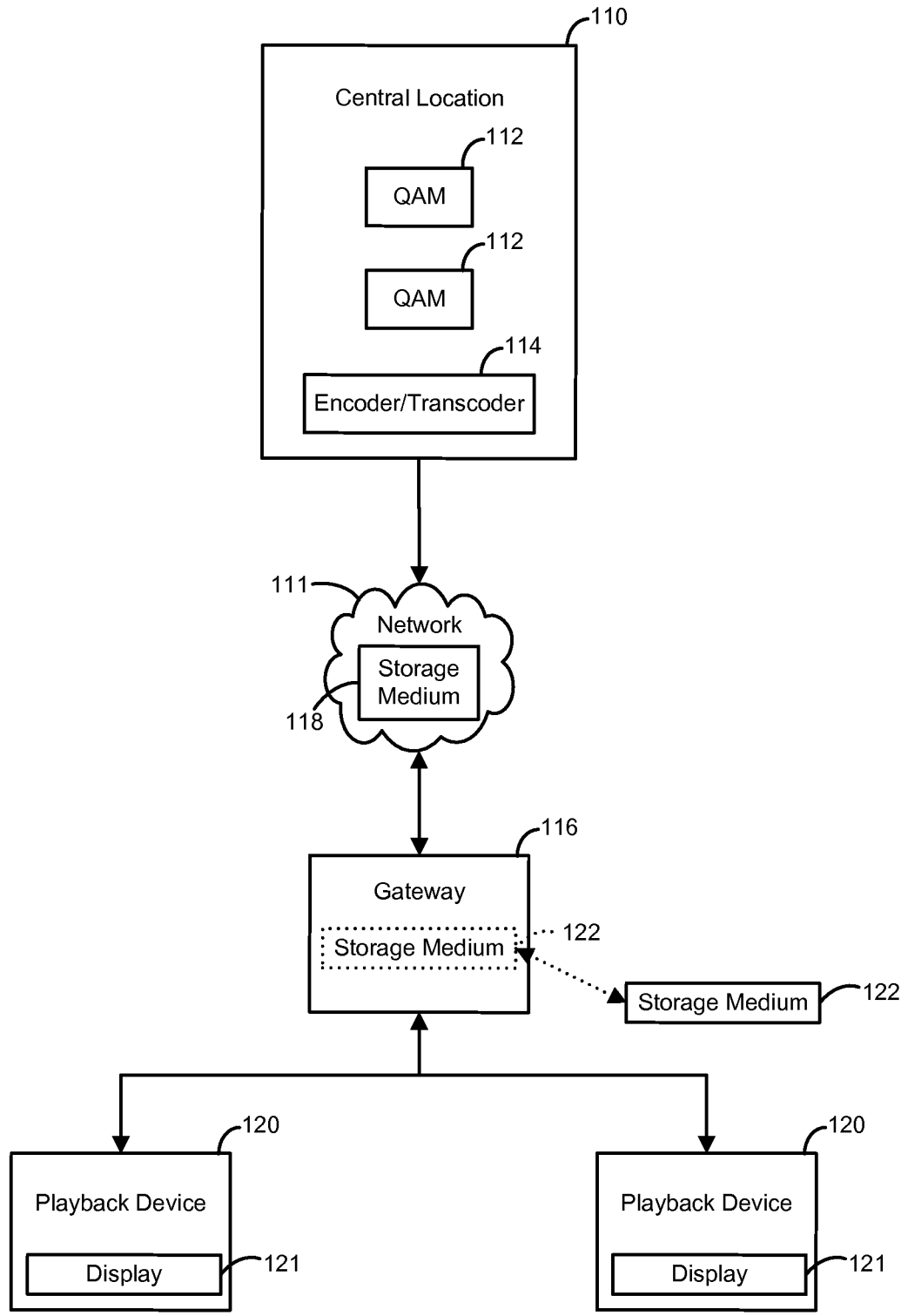
FIG. 1 is a block diagram of an example system and network.

FIG. 1 illustrates various aspects of an exemplary network environment in which the present methods and systems can operate. Some aspects of the present disclosure relate to methods and systems for content control. Those skilled in the art will appreciate that present methods may be used in systems that employ both digital and analog equipment. One skilled in the art will appreciate that provided herein is a functional description and that the respective functions can be performed by software, hardware, or a combination of software and hardware. Although one or more figures illustrate television content type data, the disclosure can be practiced with any data.

The system and network can comprise a central location 110 (e.g., a headend, or processing facility), which can receive content (e.g., data, input programming) from multiple sources. The central location 110 can combine the content from the various sources and can distribute the content to user locations (e.g., device location) via a distribution system and/or network, such as network 111.

In an aspect, the central location 110 can be a data processing facility configured to receive content from a variety of sources. The content can be transmitted from the source to the central location 110 via a variety of transmission paths, including wireless and terrestrial paths. The central location 110 can comprise one or a plurality of signal modulators such as quadrature amplitude modulation (QAM) devices 112 that can be associated with an input source. The QAM devices 112 can convert received content into a modulated output signal suitable for transmission over the network 111. MPEG encoders, such as an encoder 114, can be included for encoding/transcoding data such as content. As an example, a data packaging device, such as a fragmentor, can be integrated with the encoder 114 (or separate and in communication with the encoder 114) to package the encoded/transcoded content. In an aspect, the encoder 114 and/or fragmentor can repeatedly embed markers, flags, and signals into the content data stream for processing by downstream devices.

The network 111 can be configured to distribute signals from the central location 110 to user and/or device locations, such as a location of a gateway 116 or one or more playback devices 120. The network 111 can be an optical fiber network, a broadband network, a coaxial cable network, a hybrid fiber-coaxial network, a wireless network, a satellite system, a direct broadcast system, or any combination thereof. There can be a multitude of user locations connected to network 111. In an aspect, the network 111 can comprise a storage medium 118. As an example, the storage medium 118 can be configured as network storage such as cloud storage accessible by one or more playback devices 120 and/or the gateway 116. As a further example, a number of content assets (e.g., video, audio, etc.) can be loaded into the storage medium 118 and stored for playback or processing by the one or more playback devices 120 and/or the gateway 116. However, other data, content, and/or information can be stored in the storage medium 118 such as advertisements and alternative content, for example. In an aspect, the storage medium 118 can be separate from the network 111. For example, the storage medium 118 can be located upstream of one or more playback devices 120 and/or the gateway 116 and downstream of the network 111. As another example, the storage medium 122 (e.g., static or removable) can store information to be transmitted to any number of the playback devices 120 and/or the gateway 116, or other recipient devices. As a further example, the playback devices 120 and/or the gateway 116 can process a data stream, which can comprise audio, video, or other data from the network 111 with a regular cadence (e.g., every two seconds, four seconds, ten seconds, and the like). Other data and tracks can be received and processed by the playback devices 120 and/or the gateway 116.

In an aspect, the playback devices 120 and/or the gateway 116 can be configured as a decoder, such as a gateway, set-top box, or communications terminal (CT) to decode, if needed, the signals for display on a display device, such as on a display 121. Those skilled in the art will appreciate that the signal can be decoded in a variety of equipment, including a CT, a computer, a TV, a monitor, or a satellite dish. In an exemplary aspect, the methods and systems disclosed can be located within, or performed on, one or more CT's, displays 121, central locations 110, DVR's, home theater PC's, and the like. As an example, the gateway 116 can receive signals from the network 111 for rendering content via the playback device 120. As an example, rendering content can comprise providing audio and/or video, displaying images, facilitating an audio or visual feedback, tactile feedback, and the like. However, other content can be rendered via the playback device 120. As an example, the playback devices 120 and/or the gateway 116 can be an Internet Protocol compatible device for receiving signals via a network such as the Internet or some other communications network for providing content to the user. It is understood that other display devices and networks can be used.

In an aspect, the one or more playback devices 120 and/or the gateway 116 can be configured to receive a removable storage medium (e.g., storage medium 122). As an example, the storage medium 122 can comprise a flash memory. As a further example, a number of content assets (e.g., video, audio, etc.) can be written to the storage medium 122 and stored for playback or processing (e.g., trick play) by the associated gateway 116. However, other data, content, and/or information can be stored in the storage medium 122 such as advertisements and alternative content, for example. In an aspect, the storage medium 122 can be separate from the gateway 116 and in communication with the gateway 116 such as via a portable flash drive. In an aspect, the storage medium 122 can be used to provide a time shift buffer for caching a portion (e.g., a playback duration) of a current transport stream received from the network 111. As an example, the cached portion can be leveraged to provide trick play features during playback.

Figure 2:
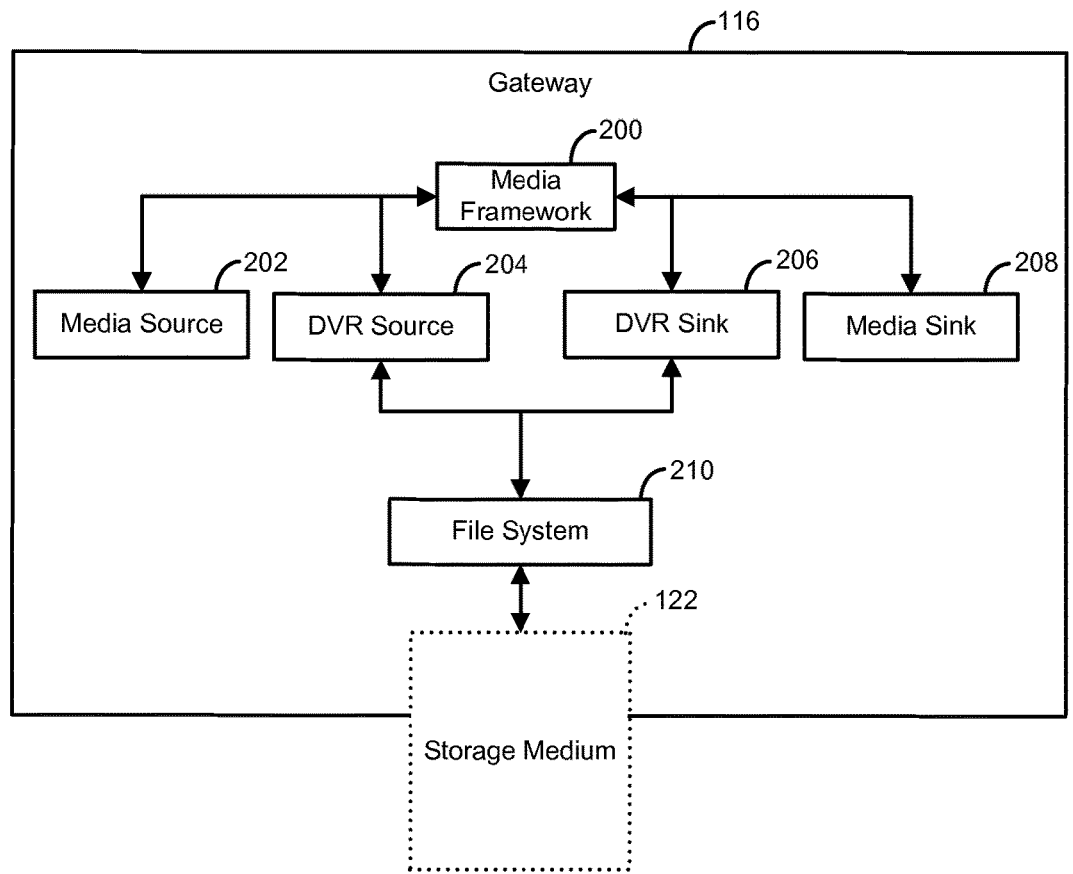
FIG. 2 is a block diagram of an example gateway.

FIG. 2 illustrates an example of the gateway 116. As shown, the user gateway 116 can comprise a media framework 200 for managing one or more media components (e.g., plug-ins) configured to control, for example, simple audio playback, audio and video playback, recording, streaming and editing. The media framework 200 can comprise hardware and/or software for managing the media components and service flows to/from the media components. In an aspect, the media components can comprise a media source 202, a DVR source 204, a DVR sink 206, and a media sink 208, or the like.

The media source 202 (e.g., home network source) can be or comprise software for receiving data, processing data, and outputting a content stream (e.g., single program transport stream (SPTS)). As an example, the media source 202 can be configured to decrypt content, for example, using digital transmission content protection (DTCP). As a further example, the media source 202 can be configured to communicate decrypted content to devices (e.g., the playback device 120) on a user network or elsewhere.

The DVR source 204 can be or comprise software for receiving data, processing data, and outputting a content stream (e.g., single program transport stream). As an example, the DVR source 204 can be configured to manage the playback of stored content. As another example, the DVR source 204 can be configured to read content from storage and to output a content stream (e.g., MPEG SPTS) to recipient devices (e.g., the playback device 120).

The DVR sink 206 can be or comprise software for managing the storing and indexing of data such as at least a portion of a content stream. As an example, the DVR sink 206 can be configured to store data to effect a time shift buffer and to enable trick play features. As a further example, the DVR sink 206 can be configured to store data as a persistent recording for subsequent retrieval and playback.

The media sink 208 can be or comprise software for managing the playback of data such as a live or recorded content stream. As an example, the media sink 208 can be configured to start/stop playback of content. As another example, media sink 208 can be configured to manage trick play features of the playback content.

In an aspect, the gateway 116 can comprise a file system 210, such as a flash file system for interfacing with the storage medium 122. The file system 210 can be configured to manage the storage and retrieval of data to/from the storage medium 122. The file system 210 can comprise drivers to facilitate the management of various types and configurations of the storage medium 122. As an example, the file system 210 can manage the storage/retrieval of data to/from the storage medium 122 to provide a time shift buffer for caching a portion (e.g., a playback duration) of a current transport stream. As an example, the cached portion can be leveraged to provide trick play features during playback.

Figure 3A:
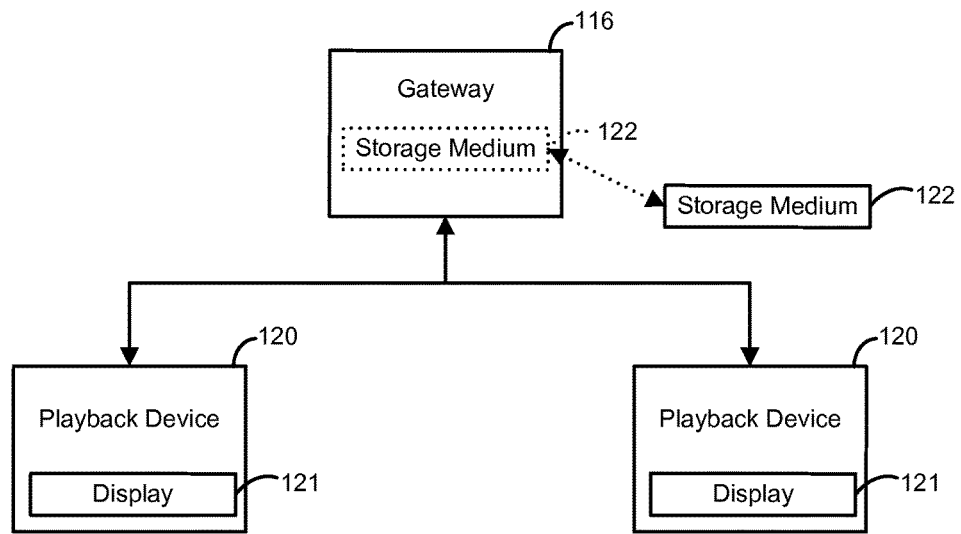
FIG. 3A is a representation a network of devices.
Figure 3B:
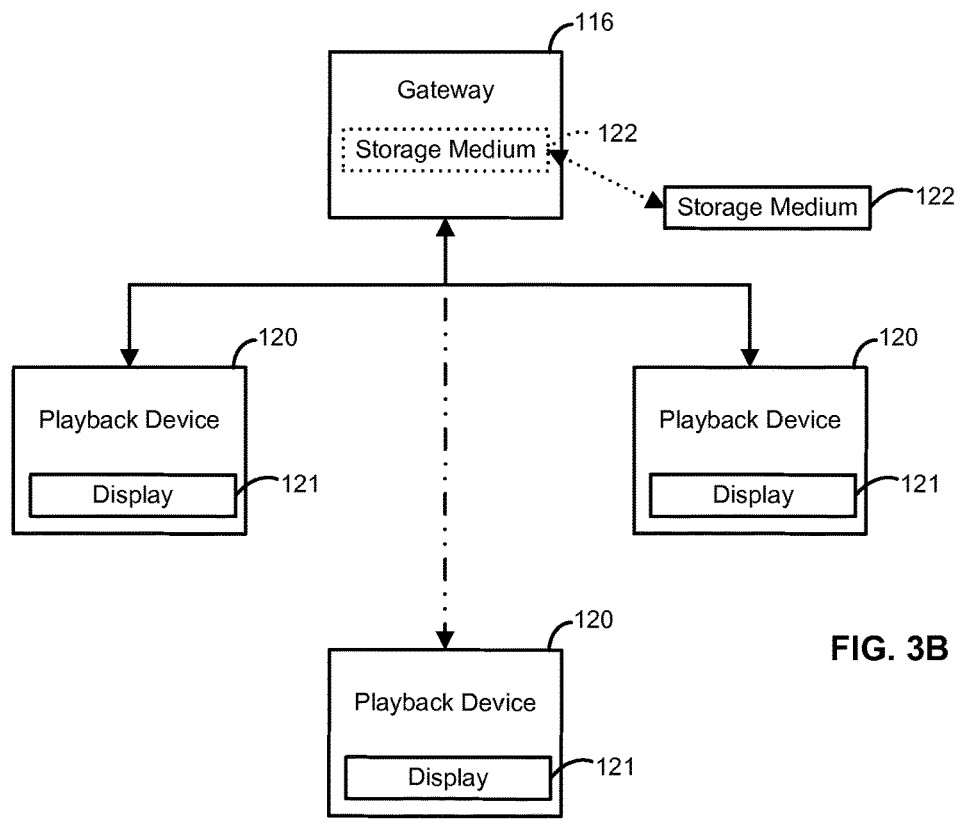
FIG. 3B is a representation of another network of devices.

FIGS. 3A-3B illustrate representations of a network of the playback devices 120 in communication with the gateway 116. FIG. 3A illustrates two playback devices 120 in an active communication session with the gateway 116. As an example, the number of supported communication sessions/devices can be based on a maximum bandwidth required for a maximum bitrate record and reads for normal speed playback (e.g., a sum of the record and playback bitrates for all concurrent streams). In the case that this maximum number of sessions/clients is simultaneously active, and all sessions/clients are using the maximum bitrate stream, then the maximum I/O bandwidth to storage (e.g., cloud, local storage, SD flash storage, etc.) or network bandwidth for each session/client can be limited to the I/O or network bandwidth for normal speed playback. The limitation can be achieved by reducing the frame rate for trick play such that the bandwidth load is less than or equal to the nominal bandwidth used at normal playback speed.

As additional devices (e.g., clients, playback devices 120, etc.) request playback streams from the gateway 116, as shown in FIG. 3B, the gateway can determine if such a request can be supported. As an example, the gateway 116 can determine (e.g., calculate, estimate) a bandwidth (e.g., based on I/O to flash memory and/or other network resources or storage mediums) required based on normal speed playback. As a further example, I/O bandwidth to/from the flash memory (e.g., storage medium 122) can be prioritized over other transfer bandwidth requirements. Such prioritization can be based at least in part of the following ordered hierarchy:

1. Audio/video (A/V) stream and index file write;
2. A/V stream and index file read for normal video playback speed (e.g., 1× speed);
3. Greater than normal 1× forward or reverse trick playback; and
4. The remaining flash I/O bandwidth is reduced by reducing the frame rate of trick plays so that the threshold (e.g., maximum) I/O bandwidth is not exceeded.

Other priorities and hierarchies can be used. In certain aspects, a user experience may be improved by facilitating/maintaining a higher frame rate, while one or more device enter a trick play mode. As an example, the total available bandwidth for a group of devices (or a location having multiple devices) may be determined and any unused/unallocated bandwidth may be allocated to the devices in a trick play mode such that the frame rate and/or trick play bandwidth need not be limited for the devices. As a further example, if only one device is in trick play, then the trick play bandwidth may not be limited to the nominal 1× bandwidth and frame rates may not need to be reduced. If multiple devices enter a trick play mode, then adjustment of I/O bandwidth and/or frame rate may need to be adjusted.

Figure 4:
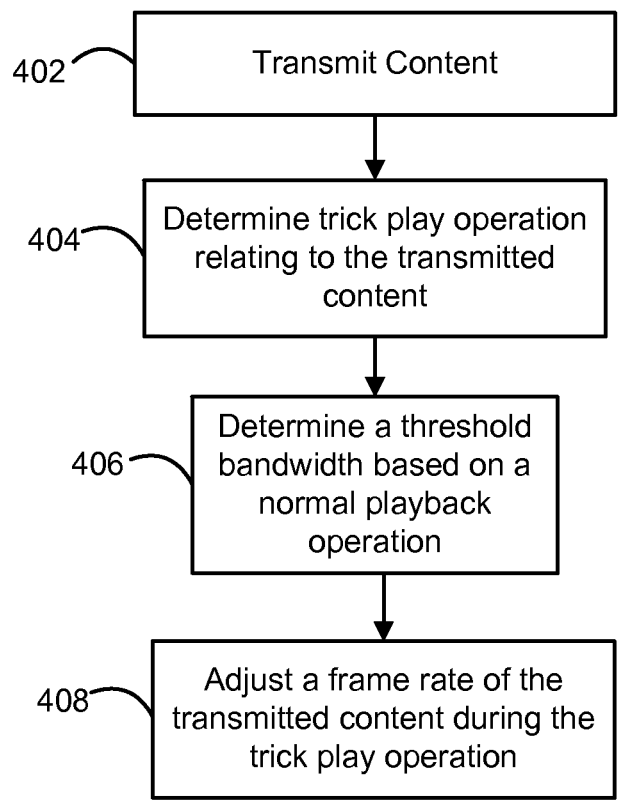
FIG. 4 is a flow chart of an example method.
Figure 5:
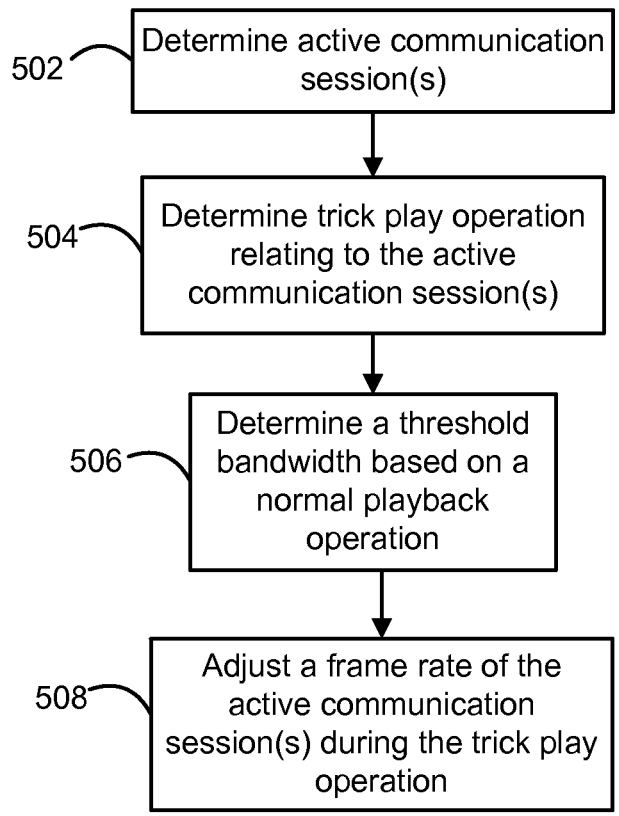
FIG. 5 is a flow chart of an example method.
Figure 6:
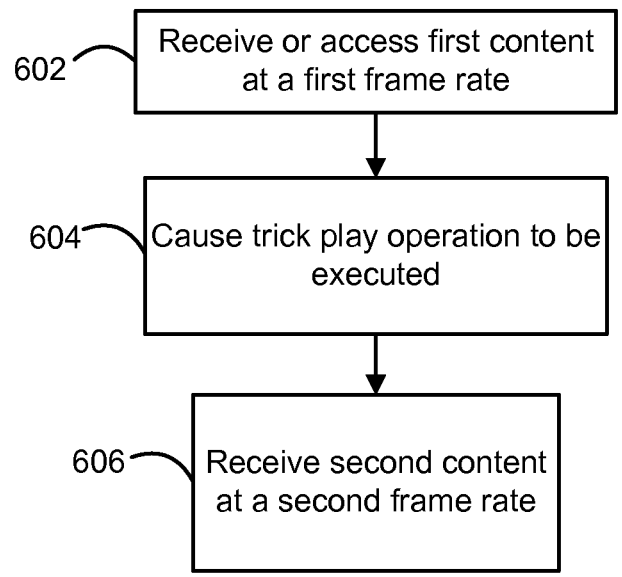
FIG. 6 is a flow chart of an example method.

FIGS. 4-6 illustrate operating procedures that can be used to manage bandwidth between a network of devices. In an aspect, FIG. 4 depicts example operating procedures that may be implemented by the systems and networks described hereon. In operation 402, content can be transmitted, for example to one or more playback devices. In an aspect, the one or more playback devices (e.g., playback device 120 (FIG. 1)) can receive the content and can process the content for playback. As an example, the content can be transmitted to a plurality of playback devices. The transmitted content can comprise audio information, video information, index information, or a combination thereof. The transmitted content can comprise a plurality of frames, such as frames relating to a Group of Pictures (GOP) schema. The one or more playback devices receiving the content can process the content to provide a playback of the content to a user of the playback devices, such as a video for example.

In operation 404, a trick play operation can be determined (e.g., detected), for example, by the playback device processing the content received in operation 402 and/or a device transmitting the content such as gateway 116 (FIG. 1). In an aspect, the trick play operation can relate to the playback speed of the transmitted content. As an example, the trick play operation can comprise one or more of fast-forward, rewind, pause, and the like. As another example, the trick play operation can be facilitated by one or more software plug-ins such as a sink element (e.g., sink 206, 208 (FIG. 2)). As a further example, the trick play operation can be facilitated by a flash memory (e.g., storage medium 122 (FIG. 2)). In certain aspects, the flash memory can be coupled to the playback device processing the content. As an example, the flash memory can be used to facilitates one or more trick play operations by caching content such as a time shift buffer.

In operation 406, a threshold bandwidth can be determined, for example, by the playback device processing the content received in operation 402 and/or a device transmitting the content such as gateway 116 (FIG. 1). In an aspect, the threshold bandwidth can be determined based on normal (e.g., non-trick play) playback of the content. As an example, the determining the threshold bandwidth is based at least in part on a number of playback devices receiving the transmitted content or a bit rate of the transmitted content, or both. As a further example, the threshold bandwidth can be based on a maximum bandwidth required for the maximum bitrate write and reads for normal speed playback (e.g., a sum of the record and playback bitrates for all concurrent streams).

In operation 408, a frame rate of the transmitted content can be adjusted during the trick play operation. In an aspect, the frame rate can be adjusted such that a bandwidth during the trick play operation is less than or equal to the determined threshold bandwidth of operation 406. As an example, adjusting the frame rate of the transmitted content can comprise reducing the frame rate of the transmitted content.

FIG. 5 depicts example operating procedures that may be implemented by the systems and networks described hereon. In operation 502, one or more active communication sessions can be determined (e.g., detected), for example, by a communications device such as the gateway 116 (FIG. 1) and/or the playback device 120 (FIG. 1). In an aspect, detection of an active communication session can comprise detecting transmission and/or receipt of data. As an example, the active communication sessions can comprise actively causing a load on network resources such as bandwidth. Such active communication sessions can relate to transmitting and receiving content. As a further example, the content can comprise audio information, video information, index information, or a combination thereof. The content can comprises a plurality of frames, such as frames relating to a Group of Pictures (GOP) schema.

In operation 504, a trick play operation can be determined (e.g., detected), for example, by a communications device such as the gateway 116 (FIG. 1) and/or the playback device 120 (FIG. 1). In an aspect, the trick play operation can relate to at least one communication session of the one or more communication sessions. As an example, the trick play operation can comprise one or more of fast-forward, rewind, pause, and the like. As another example, the trick play operation can be facilitated by one or more software plug-ins such as a sink element. As a further example, the trick play operation can be facilitated by a flash memory.

In operation 506, a threshold bandwidth can be determined, for example, by a communications device such as the gateway 116 (FIG. 1) and/or the playback device 120 (FIG. 1). In an aspect, the threshold bandwidth can be determined based on normal (e.g., non-trick play) communication session. As an example, the determining the threshold bandwidth is based at least in part on a number of playback devices receiving the transmitted content or a bit rate of the transmitted content, or both. As a further example, the threshold bandwidth can be based on a maximum bandwidth required for the maximum bitrate write and reads for normal speed playback (e.g., a sum of the record and playback bitrates for all concurrent streams).

In operation 508, a frame rate of the at least one communication session can be adjusted, for example, by a communications device such as the gateway 116 (FIG. 1) and/or the playback device 120 (FIG. 1). In an aspect, the frame rate can be adjusted for one or more communication sessions by a centralized device such as the gateway 116 (FIG. 1). The frame rate can be adjusted for devices executing a trick play operation, for example. The frame rate can be adjusted (e.g., reduced) such that a bandwidth of the at least one communication session is less than or equal to the determined threshold bandwidth. When normal playback resumes, for example, the frame rate can return to a pre-adjusted rate or default rate.

FIG. 6 depicts example operating procedures that may be implemented by the systems and networks described hereon. In operation 602, first content can be received or accessed, for example by a playback device (e.g., the playback device 120 (FIG. 1)). In an aspect, the first content can be received or accessed at a first frame rate. As an example, the first content can comprise audio information, video information, index information, or a combination thereof. As another example, the first content can comprises a plurality of frames, such as frames relating to a Group of Pictures (GOP) schema.

In operation 604, a trick play operation can be caused to execute, for example, via a request from the playback device 120 (FIG. 1). In an aspect, the trick play operation can relate to the control of the received first content. As an example, the trick play operation can comprise one or more of fast-forward, rewind, pause, and the like. As another example, the trick play operation can be facilitated by one or more software plug-ins such as a sink element. As a further example, the trick play operation can be facilitated by a flash memory.

In operation 606, second content can be received or accessed, for example by a playback device (e.g., the playback device 120 (FIG. 1)). In an aspect, the second content can be received or accessed by the playback device during the trick play operation. As an example, the second content can be received at a second frame rate. As another example, the second frame rate can maintain a bandwidth during the trick play operation that is less than or equal to a threshold bandwidth associated with a normal playback of the first content. As a further example, the second frame rate is less than the first frame rate. In an aspect, the threshold bandwidth can be determined based on normal (e.g., non-trick play) playback for one or more devices. As an example, the determining the threshold bandwidth is based at least in part on a number of playback devices receiving the transmitted content or a bit rate of the transmitted content, or both. As a further example, the threshold bandwidth can be based on a maximum bandwidth required for the maximum bitrate write and reads for normal speed playback (e.g., a sum of the record and playback bitrates for all concurrent streams).

In at least some aspects, a server that implements a portion or all of one or more of the technologies described herein may include a general-purpose computer system that includes or is configured to access one or more computer-accessible media.

Figure 7:
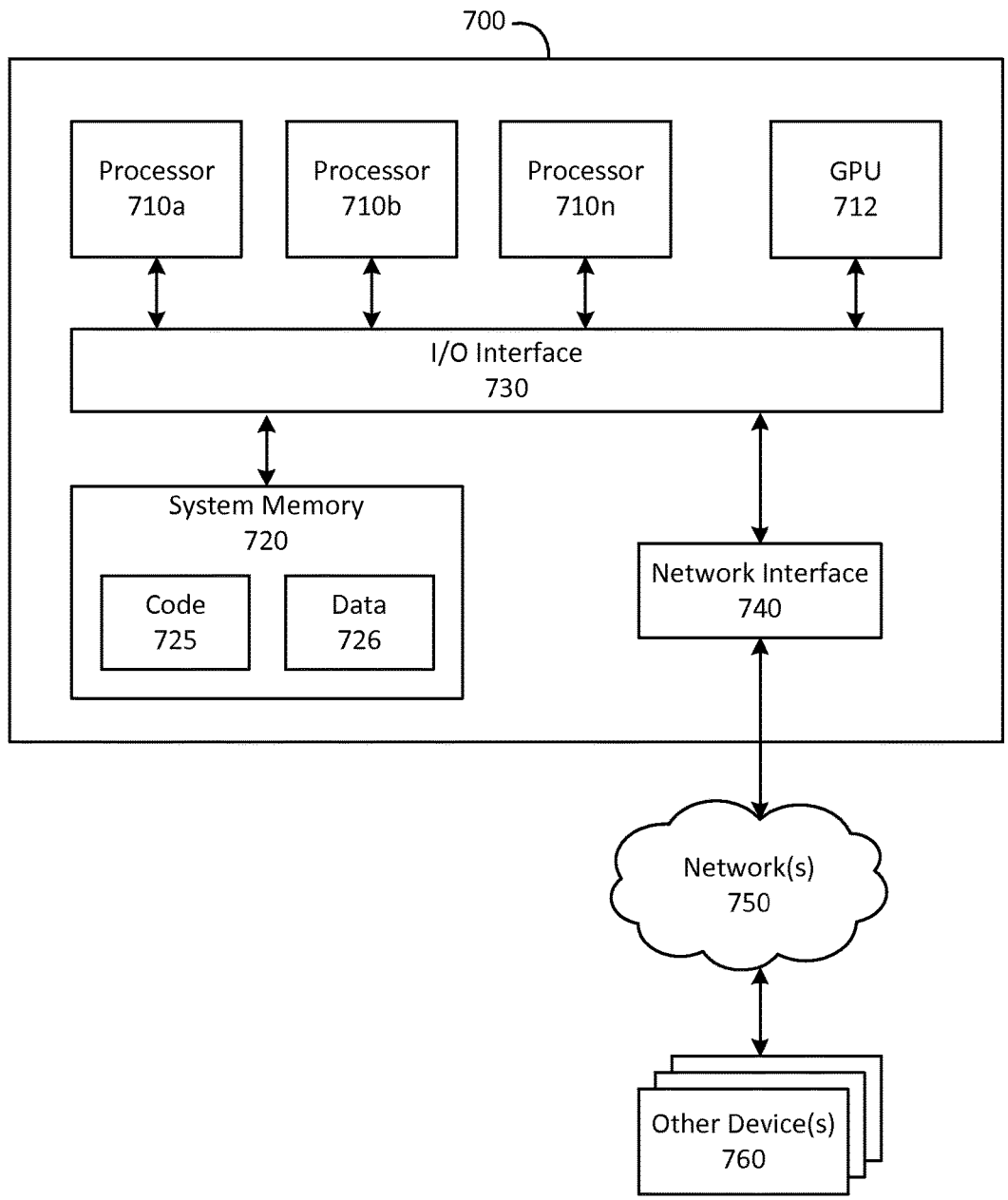
FIG. 7 is a block diagram of an exemplary computing system.

FIG. 7 depicts a general-purpose computer system that includes or is configured to access one or more computer-accessible media. In the illustrated aspect, a computing device 700 includes one or more processors 710*a*, 710*b*, and/or 710*n* (which may be referred herein singularly as a processor 710 or in the plural as the processors 710) coupled to a system memory 720 via an input/output (I/O) interface 730. The computing device 700 further includes a network interface 740 coupled to the I/O interface 730. In an aspect, one or more of the gateway 116 (FIG. 1) and the playback device 120 (FIG. 1) can be embodied as the computing device 700.

In various aspects, the computing device 700 may be a uniprocessor system including one of the processors 710 or a multiprocessor system including several of the processors 710 (e.g., two, four, eight, or another suitable number). The processors 710 may be any suitable processors capable of executing instructions. For example, in various aspects, the processor(s) 710 may be general-purpose or embedded processors implementing any of a variety of instruction set architectures (ISAs), such as the x86, PowerPC, SPARC, or MIPS ISAs, or any other suitable ISA. In multiprocessor systems, each of the processors 710 may commonly, but not necessarily, implement the same ISA.

In some aspects, a graphics processing unit ("GPU") 712 may participate in providing graphics rendering and/or physics processing capabilities. A GPU may, for example, comprise a highly parallelized processor architecture specialized for graphical computations. In some aspects, the processors 710 and the GPU 712 may be implemented as one or more of the same type of device.

The system memory 720 may be configured to store instructions and data accessible by the processor(s) 710. In various aspects, the system memory 720 may be implemented using any suitable memory technology, such as static random access memory ("SRAM"), synchronous dynamic RAM ("SDRAM"), nonvolatile/Flash®-type memory, or any other type of memory. In the illustrated aspect, program instructions and data implementing one or more desired functions, such as those methods, techniques and data described above, are shown stored within the system memory 720 as code 725 and data 726.

In one aspect, the I/O interface 730 may be configured to coordinate I/O traffic between the processor(s) 710, the system memory 720 and any peripherals in the device, including the network interface 740 or other peripheral interfaces. In some aspects, the I/O interface 730 may perform any necessary protocol, timing or other data transformations to convert data signals from one component (e.g., the system memory 720) into a format suitable for use by another component (e.g., one or more of the processors 710). In some aspects, the I/O interface 730 may include support for devices attached through various types of peripheral buses, such as a variant of the Peripheral Component Interconnect (PCI) bus standard or the Universal Serial Bus (USB) standard, for example. In some aspects, the function of the I/O interface 730 may be split into two or more separate components, such as a north bridge and a south bridge, for example. Also, in some aspects some or all of the functionality of the I/O interface 730, such as an interface to the system memory 720, may be incorporated directly into the processor 710.

The network interface 740 may be configured to allow data to be exchanged between the computing device 700 and other devices 760 attached to a network or networks 750, such as other computer systems or devices, for example. In various aspects, the network interface 740 may support communication via any suitable wired or wireless general data networks, such as types of Ethernet networks, for example. Additionally, the network interface 740 may support communication via telecommunications/telephony networks, such as analog voice networks or digital fiber communications networks, via storage area networks, such as Fibre Channel SANs (storage area networks), or via any other suitable type of network and/or protocol.

In some aspects, the system memory 720 may be one aspect of a computer-accessible medium configured to store program instructions and data as described above for implementing aspects of the corresponding methods and apparatus. However, in other aspects, program instructions and/or data may be received, sent, or stored upon different types of computer-accessible media. Generally speaking, a computer-accessible medium may include non-transitory storage media or memory media, such as magnetic or optical media, e.g., disk or DVD/CD coupled to the computing device 700 via the I/O interface 730. A non-transitory computer-accessible storage medium may also include any volatile or non-volatile media, such as RAM (e.g., SDRAM, DDR SDRAM, RDRAM, SRAM, etc.), ROM, etc., that may be included in some aspects of the computing device 700 as the system memory 720 or another type of memory. Further, a computer-accessible medium may include transmission media or signals, such as electrical, electromagnetic or digital signals, conveyed via a communication medium, such as a network and/or a wireless link, such as those that may be implemented via the network interface 740. Portions or all of multiple computing devices, such as those illustrated in FIG. 7, may be used to implement the described functionality in various aspects; for example, software components running on a variety of different devices and servers may collaborate to provide the functionality. In some aspects, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

A compute node, which may be referred to also as a computing node, may be implemented on a wide variety of computing environments, such as tablet computers, personal computers, smartphones, game consoles, commodity-hardware computers, virtual machines, web services, computing clusters, and computing appliances. Any of these computing devices or environments may, for convenience, be described as compute nodes or as computing nodes or computing nodes.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and web services offered by the provider network. The resources may in some aspects be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size, and so on), and a specified software stack (e.g., a particular version of an operating system, which may in turn run on top of a hypervisor).

A number of different types of computing devices may be used singly or in combination to implement the resources of the provider network in different aspects, including general-purpose or special-purpose computer servers, storage devices, network devices, and the like. In some aspects a client or user may be provided direct access to a resource instance, e.g., by giving a user an administrator login and password. In other aspects the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages, such as Ruby, Perl, Python, C, C++, and the like, or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage, and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes, and the like. Instances may further be available in specific availability zones, representing a logical region, a fault tolerant region, a data center, or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

It should be appreciated that the network topologies illustrated in the figures have been greatly simplified and that many more networks and networking devices may be utilized to interconnect the various computing systems disclosed herein. These network topologies and devices should be apparent to those skilled in the art.

It should also be appreciated that the systems in the figures are merely illustrative and that other implementations might be used. Additionally, it should be appreciated that the functionality disclosed herein might be implemented in software, hardware, or a combination of software and hardware. Other implementations should be apparent to those skilled in the art. It should also be appreciated that a server, gateway, or other computing node may comprise any combination of hardware or software that may interact and perform the described types of functionality, including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders), and various other consumer products that include appropriate communication capabilities. In addition, the functionality provided by the illustrated modules may in some aspects be combined in fewer modules or distributed in additional modules. Similarly, in some aspects the functionality of some of the illustrated modules may not be provided and/or other additional functionality may be available.

Each of the operations, processes, methods, and algorithms described in the preceding sections may be embodied in, and fully or partially automated by, code modules executed by at least one computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto may be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example aspects. The example systems and components described herein may be configured differently than described. For example, elements may be added to, removed from, or rearranged compared to the disclosed example aspects.

It will also be appreciated that various items are illustrated as being stored in memory or on storage while being used, and that these items or portions of thereof may be transferred between memory and other storage devices for purposes of memory management and data integrity. Alternatively, in other aspects some or all of the software modules and/or systems may execute in memory on another device and communicate with the illustrated computing systems via inter-computer communication. Furthermore, in some aspects, some or all of the systems and/or modules may be implemented or provided in other ways, such as at least partially in firmware and/or hardware, including, but not limited to, at least one application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other aspects. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain aspects include, while other aspects do not include, certain features, elements, and/or steps. Thus, such conditional language is not generally intended to imply that features, elements, and/or steps are in any way required for at least one aspects or that at least one aspects necessarily include logic for deciding, with or without author input or prompting, whether these features, elements, and/or steps are included or are to be performed in any particular aspect or embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example aspects have been described, these aspects have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A method comprising:
  receiving, by a gateway device, a content asset;
  receiving, by the gateway device, an indication of a trick play operation;
  determining, based on the received indication of the trick play operation and an input/output (I/O) bandwidth of one or more playback devices in communication with the gateway device for playback at a normal rate, a bandwidth threshold; and
  adjusting, by the gateway device, a frame rate of the content asset during the trick play operation such that the I/O bandwidth of the one or more playback devices during the trick play operation complies with the determined bandwidth threshold.

2. The method of claim 1, wherein the content asset comprises audio information, video information, index information, or a combination thereof.

3. The method of claim 1, wherein the method further comprises sending, to the one or more playback devices, the content asset having the adjusted frame rate.

4. The method of claim 1, wherein the determining the bandwidth threshold comprises determining an input/output (I/O) bandwidth associated with a storage medium of the one or more playback devices.

5. The method of claim 4, wherein the determining the bandwidth threshold comprises determining an input/output (I/O) allocation associated with flash memory of the one or more playback devices.

6. The method of claim 1, wherein the determining the bandwidth threshold is based at least in part on a number of the one or more playback devices configured to receive content from the gateway device.

7. The method of claim 1, wherein the adjusting the frame rate comprises reducing a number of frames in at least a portion of the content asset received by the gateway device.

8. A method comprising:
  determining, by a gateway device, a trick play operation associated with a content asset and at least one communication session of a plurality of active communication sessions;
  determining, based on a bandwidth of the plurality of active communication sessions when the content asset is played back at a normal rate, a bandwidth threshold;
  adjusting, by the gateway device, a frame rate of the content asset during the trick play operation such that a bandwidth of the plurality of active communication sessions complies with the determined bandwidth threshold; and
  sending, to a playback device associated with at least one communication session, the content asset comprising the adjusted frame rate.

9. The method of claim 8, wherein the content asset comprises audio information, video information, index information, or a combination thereof.

10. The method of claim 8, wherein the determining the bandwidth threshold comprises determining an input/output (I/O) bandwidth associated with a storage medium.

11. The method of claim 8, wherein the determining the bandwidth threshold is based at least in part on a number of the plurality of active communication sessions.

12. A method comprising:
  receiving, by a gateway device, a content asset having a number of frames;
  determining a session bandwidth threshold associated with the gateway device;
  receiving, by the gateway device, an indication of a trick play operation;
  decreasing, by the gateway device and based on the session bandwidth threshold and the indication of the trick play operation, the number of frames of the content asset; and
  sending the content asset having the decreased number of frames in compliance with the session bandwidth threshold.

13. The method of claim 12, wherein the sending the content asset having the decreased number of frames comprises sending the content asset to a plurality of playback devices.

14. The method of claim 12, wherein the determining the session bandwidth threshold associated with the gateway device is based at least in part on a number of playback devices configured to receive content from the gateway device.

15. The method of claim 12, wherein the determining the session bandwidth threshold associated with the gateway device is based at least in part on a bandwidth usage of one or more playback devices executing a non-trick play operation.

16. The method of claim 12, wherein the determining the session bandwidth threshold associated with the gateway device comprises determining an input/output (I/O) bandwidth associated with a storage medium.

17. The method of claim 12, wherein the determining the session bandwidth threshold associated with the gateway device comprises determining an input/output (I/O) allocation associated with flash memory.

18. The method of claim 12, wherein the decreasing the number of frames comprises removing I-frames from the content asset.

19. The method of claim 12, wherein the decreasing the number of frames comprises removing B-frames from the content asset.

20. The method of claim 12, wherein the decreasing the number of frames comprises removing P-frames from the content asset.

* * * * *